No. 625,287. Patented May 16, 1899.
C. BRAULT.
MANUFACTURE OF ELEMENTS FOR SECONDARY BATTERIES.
(Application filed Dec. 29, 1898.)
(No Model.)

Witnesses.
Robert Everett,

Inventor.
Camille Brault.
By James L. Norris,
Atty.

UNITED STATES PATENT OFFICE.

CAMILLE BRAULT, OF CLICHY, FRANCE.

MANUFACTURE OF ELEMENTS FOR SECONDARY BATTERIES.

SPECIFICATION forming part of Letters Patent No. 625,287, dated May 16, 1899.

Application filed December 29, 1898. Serial No. 700,659. (No specimens.)

*To all whom it may concern:*

Be it known that I, CAMILLE BRAULT, a citizen of France, residing at 18 Ouai de Clichy, Clichy, France, have invented certain new and useful Improvements in the Manufacture and Production of Plates or Elements for Secondary Batteries, of which the following is a specification.

The object of my invention is to provide plates or elements for secondary batteries or electrical accumulators which though of small weight possess a high capacity and great solidity and strength.

Each plate or element is formed, essentially, of a number of small pieces or tablets of agglomerated lens-shaped active material or material to be rendered active, firmly held between the bars of two grids of lead or of lead alloyed with antimony, made by casting, stamping, or other suitable means. They are formed of a number of longitudinal and transverse bars triangular in cross-section and inclosing, preferably, rectangular spaces to be filled with the active material or material to be rendered active. Each plate or element is provided with two different grids. One grid has holes at the intersection of its bars, the other grid having conical projections for entering the holes of the first grid.

Figure 1:
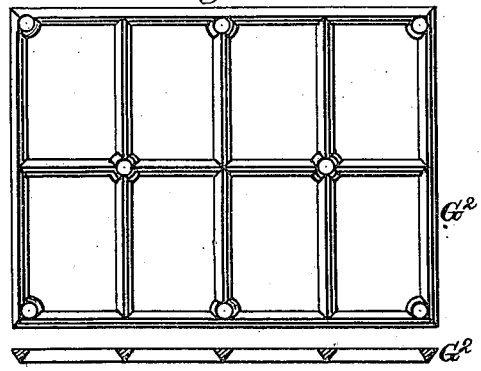
Figure 2:
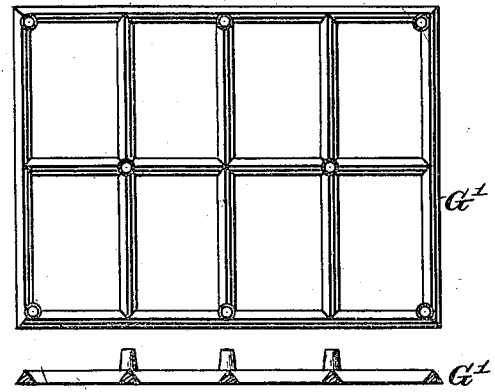
Figure 2:
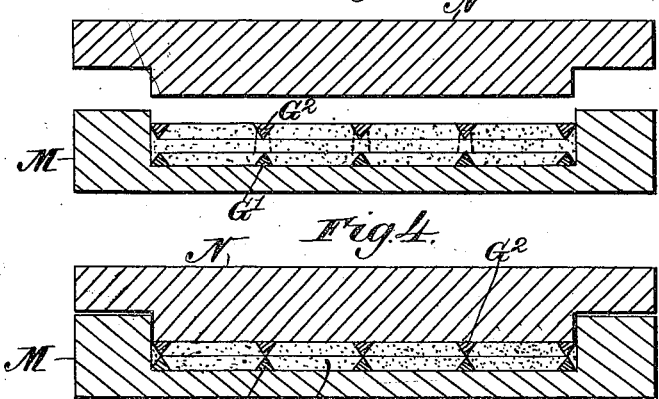

Figure 1 represents a plan and section of an upper grid, and Fig. 2 a plan and section of a lower grid, employed in forming the accumulator plates or elements. Fig. 3 is a sectional view representing the manner of arranging the grids and plate-forming material in a mold, and Fig. 4 is a similar view showing the two grids and interposed material forced together by closing down the mold-cover.

The active material or material to be rendered active is prepared in the following peculiar way, which I will now fully describe.

I make an intimate mixture of oxid of lead (litharge) with about ten per cent. of sulfate of calcium or other alkali-metal salt or alkali-earth-metal salt—such, for example, as sulfate, nitrate, or phosphate of sodium, potassium, calcium, or magnesium. When preparing the material for the negative plates, I add to this mixture one to three per cent. of double chlorid of platinum and mercury. After these materials have been well mixed I work up or knead them in about ten per cent. of distilled water in a hermetically-closed vessel provided with two orifices, by which ammonia-gas is caused to pass through the material during the kneading, the gas entering by one of the said orifices and passing out by the other. Under the influence of the ammonia-gas absorbed in part by the water contained in the now pasty mass the said mass gradually becomes hard and commences to solidify. When this takes place, I remove the material from the vessel and I spread it in thin layers on tables or other supports and allow it to dry in the air. To hasten the drying, a stream of dry cold air may be passed over the material, but the use of heat for this purpose should be avoided. When thoroughly dry, the material is pulverized, (which may be done in an ordinary crushing-mill,) and it is then ready for use in the manner hereinafter described.

With the material so prepared I manufacture the plates or elements as follows: In a rectangular mold M, Fig. 3, I place a grid G', (formed with projections, as aforesaid,) and I then place in the mold the powder prepared as hereinbefore described, and I level the surface of the powder, and then I place a second grid $G^2$ (formed with holes, as aforesaid) in position over the first grid, so that the holes in the upper grid come over the projections on the lower grid. I then place an upper part or cover N, accurately fitting the mold, on the upper grid $G^2$, and the whole is then subjected to strong pressure, so that the upper part or cover enters the mold and forces the two grids into contact and causes the projections of the lower grid to be riveted into the openings of the upper grid. The plate thus obtained is shown, Fig. 4. The spaces in the grids are thus filled with tablets P of strongly-agglomerated material. These tablets are lens-shaped, and they are held firmly between the bars of the grids, as illustrated. After the plate has been removed from the mol I place it in a bath of water slightly acidulted with sulfuric acid and allow it to remain therein for several hours. It is then removed and dried in the air. To connect the plates together, the positive and negative plates are soldered, respectively, to two lead or equivalent bars constituting the two poles of the secondary battery. This may be done in the ordinary manner. To prevent contact between adjacent plates, I insert in the intervening spaces rods of glass, celluloid, or ebonite or perforated and corrugated sheets of ebonite or celluloid. The formation of the secondary battery is then completed in any well-known or suitable manner.

When liquid ammonia is used for making a pasty mass in the preparation of active material for accumulator-plates, the reactions between the constituent elements are rough and sudden, whereas if the pasty mass is prepared with water and if it is afterward shaken in a closed vessel traversed by a flow of gaseous ammonia the reactions instead of being rough or sudden will be progressive and slow, and thus I obtain an active mass that differs in its properties from that obtained by the use of liquid ammonia. The plates prepared with gaseous ammonia are of greater solidity—that is to say, they are capable of supporting more charges and discharges, while having, nevertheless, the same capacity as other plates.

What I claim is—

The method of preparing an active material for accumulator-plates, which consists in subjecting a mixture of lead oxid, alkali-metal salt, and water, to the slow and progressive action of a flow of gaseous ammonia through said mixture, substantially as described.

In testimony whereof I have hereunto set my hand in presence of two subscribing witnesses.

CAMILLE BRAULT.

Witnesses:
EDWARD P. MACLEAN,
ALFRED FREY.